US009860339B2

(12) United States Patent
Shaw et al.

(10) Patent No.: US 9,860,339 B2
(45) Date of Patent: Jan. 2, 2018

(54) DETERMINING A CUSTOM CONTENT DELIVERY NETWORK VIA AN INTELLIGENT SOFTWARE-DEFINED NETWORK

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US); Jeffrey Joseph Farah, North Brunswick, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/748,166

(22) Filed: Jun. 23, 2015

(65) Prior Publication Data
US 2016/0380883 A1 Dec. 29, 2016

(51) Int. Cl.
*H01L 29/08* (2006.01)
*H04L 29/08* (2006.01)
(Continued)

(52) U.S. Cl.
CPC ............ *H04L 67/306* (2013.01); *G06F 17/30* (2013.01); *H04L 41/00* (2013.01); *H04L 67/303* (2013.01); *H04L 69/321* (2013.01)

(58) Field of Classification Search
CPC .... H04L 45/308; H04L 65/602; H04L 67/306
See application file for complete search history.

(56) References Cited

U.S. PATENT DOCUMENTS 6,275,496 B1 * 8/2001 Burns ............... G06F 17/30902
370/429
7,941,762 B1 5/2011 Tovino et al.
(Continued)

FOREIGN PATENT DOCUMENTS

| WO | 2014169289 A1 | 10/2014 |
| WO | 2014209007 A1 | 12/2014 |
| WO | 2015007331 A1 | 1/2015 |

OTHER PUBLICATIONS

Clougherty, Mark M., et al. "The Role of SDN in IP Network Evolution", Bell Labs, [http://www.bell-labs.com/newsroom/publications/294147/], retrieved on Mar. 29, 2015, 20 pages.
(Continued)

*Primary Examiner* — Chi H Pham
*Assistant Examiner* — Weibin Huang
(74) *Attorney, Agent, or Firm* — Amin, Turocy & Watson, LLP

(57) ABSTRACT

Determining a custom content delivery network is disclosed. This can comprise determining a custom content delivery network (CCDN) based on information determined by an intelligent software-defined network (ISDN). An ISDN can receive a content request and related information from a user equipment (UE). The ISDN can determine CCDN information that can be employed to provision a transport network corresponding to the CCDN information. The transport network can be customized based on the content request and the related information. Moreover, as the related information changes, the transport network can be correspondingly updated. Some embodiments disclose an ISDN operating on a virtual machine in a cloud-computing environment.

20 Claims, 10 Drawing Sheets

(51) Int. Cl.
*G06F 17/30* (2006.01)
*H04L 12/24* (2006.01)

(56) References Cited

U.S. PATENT DOCUMENTS

| | | | |
|---|---|---|---|
| 8,433,802 B2 | 4/2013 | Head et al. | |
| 8,601,471 B2 | 12/2013 | Beaty et al. | |
| 8,627,328 B2 | 1/2014 | Mousseau et al. | |
| 8,805,983 B2 | 8/2014 | Dube et al. | |
| 8,832,710 B2 | 9/2014 | Mousseau et al. | |
| 8,977,679 B2 | 3/2015 | Van Biljon et al. | |
| 2002/0083148 A1* | 6/2002 | Shaw | G06F 17/30902 709/214 |
| 2007/0245310 A1 | 10/2007 | Rosenstein et al. | |
| 2008/0301175 A1 | 12/2008 | Applebaum et al. | |
| 2010/0125477 A1 | 5/2010 | Mousseau et al. | |
| 2011/0270721 A1 | 11/2011 | Kusterer | |
| 2012/0246647 A1 | 9/2012 | Ciano et al. | |
| 2012/0311571 A1 | 12/2012 | Morgan | |
| 2013/0055202 A1 | 2/2013 | Dudek et al. | |
| 2013/0082920 A1 | 4/2013 | You et al. | |
| 2013/0166703 A1 | 6/2013 | Hammer et al. | |
| 2013/0227089 A1 | 8/2013 | McLeod et al. | |
| 2013/0246589 A1 | 9/2013 | Klemba et al. | |
| 2013/0346569 A1 | 12/2013 | Smith et al. | |
| 2014/0019471 A1 | 1/2014 | Linton et al. | |
| 2014/0130036 A1 | 5/2014 | Gurikar et al. | |
| 2014/0307556 A1* | 10/2014 | Zhang | H04L 45/302 370/236 |
| 2014/0317293 A1 | 10/2014 | Shatzkamer | |
| 2014/0328190 A1 | 11/2014 | Lord et al. | |
| 2014/0331078 A1 | 11/2014 | Cohen | |
| 2014/0337531 A1 | 11/2014 | Naseh et al. | |
| 2014/0351390 A1 | 11/2014 | Madani et al. | |
| 2014/0351623 A1 | 11/2014 | Baird | |
| 2014/0359001 A1 | 12/2014 | Dupoteau | |
| 2014/0362700 A1 | 12/2014 | Zhang | |
| 2014/0376406 A1 | 12/2014 | Kim et al. | |
| 2015/0058467 A1 | 2/2015 | Douglas et al. | |
| 2015/0058508 A1 | 2/2015 | Nguyen et al. | |
| 2015/0066571 A1 | 3/2015 | Balko | |
| 2015/0067394 A1 | 3/2015 | Naseh et al. | |
| 2015/0067604 A1 | 3/2015 | Naseh et al. | |

OTHER PUBLICATIONS

Bouten, Niels, et al. "Towards NFV-based Multimedia Delivery", Ghent University, [http://www.maps.upc.edu/rashid/files/IM2015Niels.pdf], retrieved on Mar. 29, 2015, 4 pages.

"Mule ESB," MuleSoft, Inc., [https://www.mulesoft.com/platform/soa/mule-esb-open-source-esb], retrieved on Mar. 25, 2015, 8 Pages.

"Cisco Evolved Services Platform Automating a New Class of Carrier Cloud Services," Cisco, [http://www.cisco.com/c/en/us/solutions/collateral/service-provider/service-providerstrategy/brochure-c02-731348.html], retrieved on Mar. 25, 2015, 6 Pages.

Morgan, Graham. "TfL Enterprise Geospatial Platform," The Open Group Enterprise Architecture Practitioners Conference, 2008, Spatial Consultants Ltd, United Kingdom, [www.spatialconsultants.com/case_studies/tfl-enterprise-geospatial-plafform], retrieved on Mar. 25, 2015, 1 page.

Office Action dated Jan. 10, 2017 for U.S. Appl. No. 14/723,841, 29 pages.

Office Action dated Jul. 6, 2016 for U.S. Appl. No. 14/723,841, 33 pages.

Office Action dated Jun. 2, 2017 for U.S. Appl. No. 14/723,841, 26 pages.

Office Action dated Aug. 8, 2017 for U.S. Appl. No. 14/723,841, 32 pages.

* cited by examiner

DETERMINING A CUSTOM CONTENT DELIVERY NETWORK VIA AN INTELLIGENT SOFTWARE-DEFINED NETWORK

TECHNICAL FIELD

The disclosed subject matter relates to determining a custom content delivery network, comprising determining a custom content delivery network based on information determined by an intelligent software-defined network.

BACKGROUND

By way of brief background, conventional content transport selection and/or provisioning is generally limited when employing static software-defined network (SDN) components. A static SDN generally is limited to only Layer 2 switching and Layer 3 routing aspects and does not effectively leverage other information, such as profile information, equipment information, status(es)/state(s), etc., as part of designating a content delivery network (CDN) in response to a request for content. As an example, a conventional SDN can aid in designating a conventional CDN by setting Layer 2 and/or 3 parameters based on a static rule, such as, 'minimize the number of hops', 'do (not) use cached copies', etc. As illustrated in this example, conventional rudimentary selection of a CDN employing a conventional SDN can be considered limited, in that it does not leverage additional information in managing network resources in view of the demands on the network.

DETAILED DESCRIPTION

Figure 1:
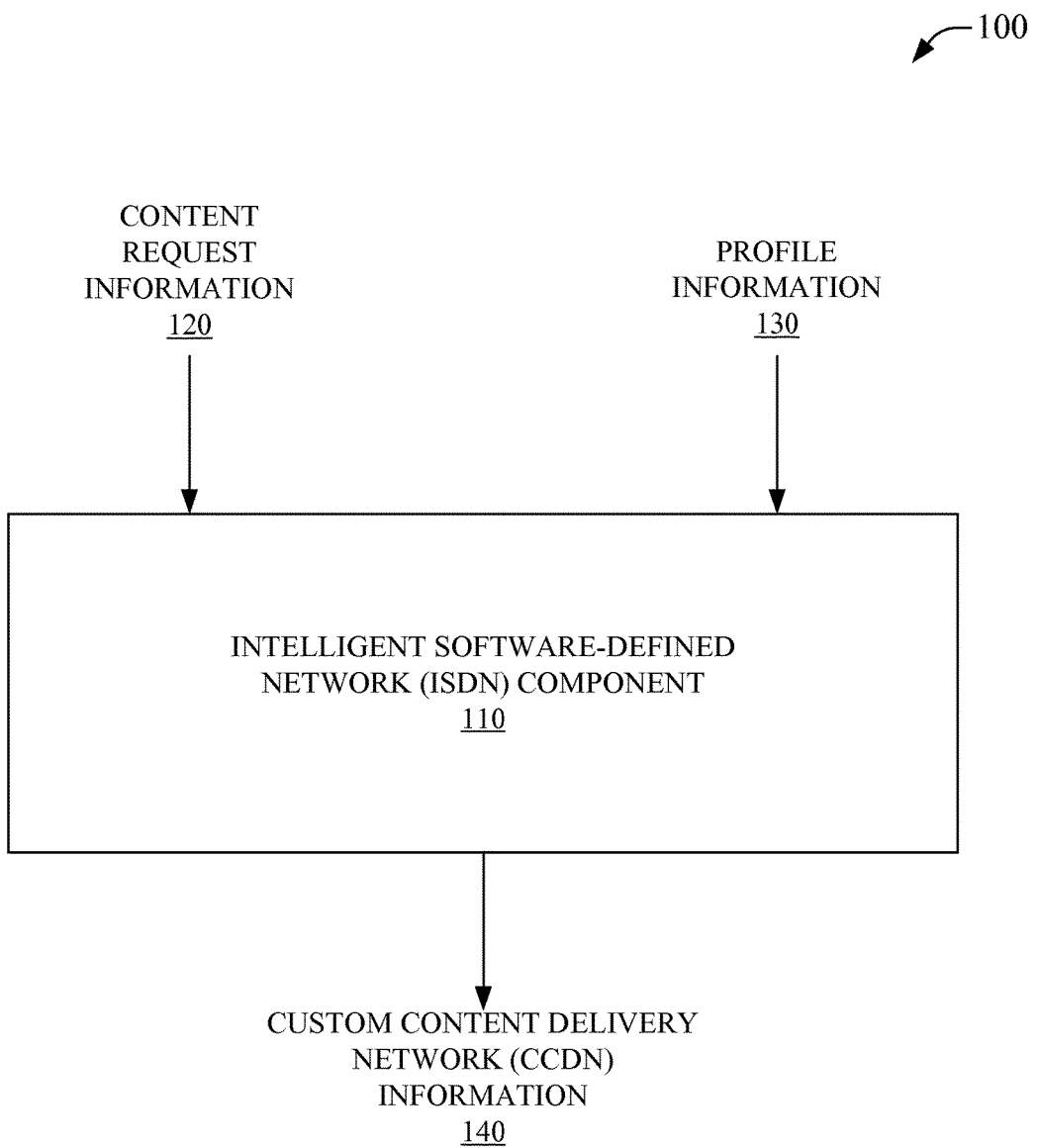
FIG. 1 is an illustration of an example system that facilitates determining a custom content delivery network via an intelligent software-defined network in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional selection/provisioning of content transport is generally limited by static software-defined network (SDN) components. A static SDN generally is limited to Layer 2 switching and Layer 3 routing while effectively ignoring other available information, such as user/device/customer profile information, equipment information, statuses/states, etc., in enabling designation of a content delivery network (CDN). As an example, a conventional SDN can aid in designation of a conventional CDN via selecting Layer 2 and/or 3 parameters based on a static rule, such as, 'minimize the number of hops', 'do use cached copies', 'do not use cached copies', etc. As illustrated in this example, conventional selection of a CDN employing a conventional SDN can be restricted by not leveraging additional information in managing network resources in view of the demands on the network.

A conventional SDN can generally interact with Layer 2 or Layer 3 devices, based on the Open Systems Interconnection (OSI) model, to aid in designating a conventional CDN. Layer 2, e.g., the data link layer, can provide the functional and procedural means to transfer data between network entities. Layer 3, e.g., the network layer, is typically responsible for packet forwarding and generally comprises routing via intermediate routers. The data link layer, e.g., Layer 2, can be directed to addressing local delivery of frames between devices on the same local area network (LAN) or nodes with a physical layer. These frames generally do not cross the boundaries of a LAN. Routing between distinct networks and global addressing can be considered higher layer functions, such that Layer 2 protocols can focus on delivery on a physical layer, e.g., addressing, media arbitration, etc. In this way, Layer 2 can be analogous to a stop light on a local street that can control traffic only locally without concern for their ultimate destination. The network layer, e.g., Layer 3, can provide functional and procedural means of transferring variable-length data sequences from a source to a destination via one or more networks. Layer 3 can comprise a connection model function, host addressing function, and message forwarding function, among others.

Where conventional CDN techniques employing SDN are used, it can be appreciated that supplementary information is generally not employed in selection of the CDN. In contrast, the instant disclosure is directed to, among other aspects, determining a custom content delivery network (CCDN) via an intelligent software-defined network, wherein an intelligent software-defined network can employ 'profile information', e.g., user/device/customer profile information, equipment information, statuses/states, metrics or other measurements, etc. Further, the instant disclosure relates that CCDN can be stored for reuse. Additionally, updates to a CCDN can be in real-time or near real-time to provide responsive adaptation as the supplementary information evolves. As an example, a smartphone can request video content from a cloud service. In response, a CCDN can be determined based on where the content is located, the available communications modalities, e.g., cellular, Bluetooth, etc., a user history, the smartphone battery state, and the determined cost sensitivity of the user. As the video content is served to the user via the CCDN, the CCDN can be stored for future use. Further, where the user is determined to be viewing something other than the smartphone, e.g., facial analysis determines that the user's eyes are only infrequently fliting over the smartphone display, the CCDN, in real-time or near real-time, can be adapted to comprise cheaper, slower, older, less reliable, higher loss, etc., transport segments where there is other demand on the network for the better transport segments. In an aspect, the CCDN can provide for adaptive transport segment provisioning based on changes in profile information, e.g., an 'attentiveness value' that can reflect how attentive a user is to the delivered content. In this example, it will be appreciated that there can be numerous benefits, comprising, but not limited to, a cost savings that can be realized by using less expensive transport links where the user is amenable to the CCDN selection and/or adaptation, an ability to extend the lifetime of devices-in-service by shunting transport to older devices in response to a lessened need for the characteristics of a newer device, etc. While additional benefits for this example, as well as for other example embodiments, will be readily appreciated, for the sake of clarity and brevity, not all examples will be expounded on, although all such examples are considered to fall within the scope of the present disclosure.

In an embodiment, a system can comprise a processor and a memory allowing execution of stored instructions to enable the processor to receive a request for delivery of content from a user equipment and receive profile information related to a condition that can be associated with the user equipment. Additionally, the processor can allow execution of stored instruction for determining transport network information based on the request and the profile information and facilitating access to the transport network information to enable the user equipment to access at least a portion of the content via a transport network provisioned based on the transport network information.

In another embodiment, a method can comprise receiving, by a system comprising a processor, content request information related to receiving content at a user equipment and receiving profile information related to an environment associated with the content request information. The system can further determined transport network information based on the content request and the profile information. The method can also facilitate, by the system, access to the transport network information to enable provisioning of a transport network based on the transport network information to facilitate access by the user equipment to at least a portion of the content.

In a further embodiment, a device can comprise a processor and a memory allowing execution of stored instructions to enable the processor to generating a content request and enable access to the content request by another device. The device can further enable access to device status information related to a characteristic associated with the device. The device can receive content associated with the content request via a transport network provisioned in response to determined network segment information, wherein the determined network segment information is based on the content request and the device status information.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates determining a custom content delivery network via an intelligent software-defined network in accordance with aspects of the subject disclosure. System 100 can comprise intelligent software-defined network (ISDN) component 110 that can receive content request information 120 and profile information 130. ISDN component 110 can determine custom content delivery network (CCDN) information 140.

In an embodiment, ISDN component 110 can determine CCDN information 140 based on content request information 120 and profile information 130. Content request information 120 can comprise information related to a request for content. As an example, content request information 120 can comprise information relating to a request to stream audio, video, or multimedia content, information relating to a request to transport data related to a voice call, video call, etc., information relating to a request to text messaging, SMS, MMS, etc., information relating to a request to instant messaging, or other threaded messaging environments, information relating to a request to access files, databases, or other data storage, etc., or information relating to nearly any other request to receive data from a data source, typically located remote from a device associated with the content request of content request information 140.

In a further aspect, profile information 130, as used herein, refers to information related to a characteristic of, or associated with, content request information 120. Profile information 130 can comprise data associated with a user profile, a device profile, a user equipment profile, a history, etc. As an example, profile information 130 can comprise a user account number, a mobile device identifier, a user selected preference, a billing tier rate, a customer loyalty account identifier, a user history in relation to the content requested, etc. Further, profile information 130 can comprise data associated with environmental conditions associated with content request information 120, such as temperature, weather, time, date, schedule, location, movement, sounds, images, series of images, etc., associated with the content request information 120. As an example, profile information 130 can comprise information indicating the requesting user device is located on a water taxi in a harbor on a sunny day at a humidity of 62%, at 4:30 pm on a Wed., despite the associated user schedule indicating that the user, and presumably the user device, should be in a work meeting, which can be based on data from the user's schedule, device measurements of time and weather, location information, and analysis of images from the device showing a sunny sky. Additionally, profile information 130 can comprise data associated with equipment or device status or state, etc., wherein the device and/or equipment can comprise a user equipment (UE), a carrier device, a network device, a communication framework device, a content serving device, etc. As an example, profile information 130 can comprise information indicating a UE battery condition or state, executing or backgrounded applications on a UE, radio access network (RAN) states or status, such as but not limited to signal-to-noise information, channel information, power information, load balancing, etc., content server locations, reliability, cached status, bandwidth history, etc., or nearly any other metric, measurement, status, or state of equipment(s) or device(s) associated with transferring content between content server(s) and consuming user equipment(s).

As used herein, profile information 130 allows ISDN component 110 to leverage information related to the conditions surrounding a content request and the character of consumption of the requested content and is expressly not limited to the examples cited herein. By leveraging information related to the conditions surrounding a content request and the character of consumption of the requested content, the network segments comprising a CCDN can be determined and updated to satisfy rules relating to profile information 130. As such, ISDN component 110 can receive nearly any type of information via profile information 130, and can determine, based on profile information 130, which network segments satisfy one or more rules relating to segments comprising transport for the requested content, e.g., content request information 120. As an example, application of the one or more rules to received profile information 130 can indicate that low speed network segments can be employed in the content transport, e.g., CCDN, because a user of the requesting user equipment is rapidly hopping between applications on the user equipment and would be unlikely to experience minor delays in content delivery, especially when an application is primarily operating in the background and only occasionally being made a foreground active application. However, where the user behavior changes, e.g., the user focuses on a single application in the foreground more extensively, based on linger time, pupillary analysis, image analysis, etc., the CCDN can be updated to select higher speed network segments for the content related to that application to improve the user experience. Further, where the example user pays for a premium tier of service, the CCDN can be updated to select the high speed network segments in accord with the premium tier, to provide the content for the foreground application while still selecting lower speed network segments for backgrounded application content transport, allowing the user to experience the premium speeds on the applications the user is more likely attentive to.

In an embodiment CCDN information 140 can comprise information related to selecting networking segments comprising a transport path between a source and a consumer. The transport path can comprise one or more network segments, wherein a segment can be a communication path between any two nodes of a network. As an example, a network segment can be a wireless segment between a mobile device and a base station, an Ethernet settlement between a switch and a router, a fiber optic segment between two gateways, a microwave segment between a ground station and a satellite, etc. The multitude of network segments can be connected to form one or more transport paths, herein typically 'transport', that can communicate data between a data source and a data consumer. CCDN information 140 can enable customized provisioning of appropriate network segments in designating the transport path. As an example, profile information 130 can indicate that network segments outside of a country are not allowed, whereby ISDN component 110 can employ a rule that rejects foreign network segments in determining the transport. As such, the example transport can be provisioned without foreign network segments based on CCDN information 140. In another example, CCDN information 140 can comprise information, based on ISDN component 110 processing of profile information 130, that allows provisioning of network segments into a transport, wherein the network segments satisfy uptime, bandwidth, and error rules. Further, ISDN 110 can determine CCDN information 140 comprising rankings of network segments, ordered lists of network segments, minimum values or metrics allowed for network segments, e.g., a floor value, maximum values or metrics for network segments, e.g., a ceiling value, ranges of values or metrics for network segments, hierarchical levels of rules, etc., to provide provisioning of effective transports with regard to the content requested and the conditions surrounding the request and satisfaction of the request.

Figure 2:
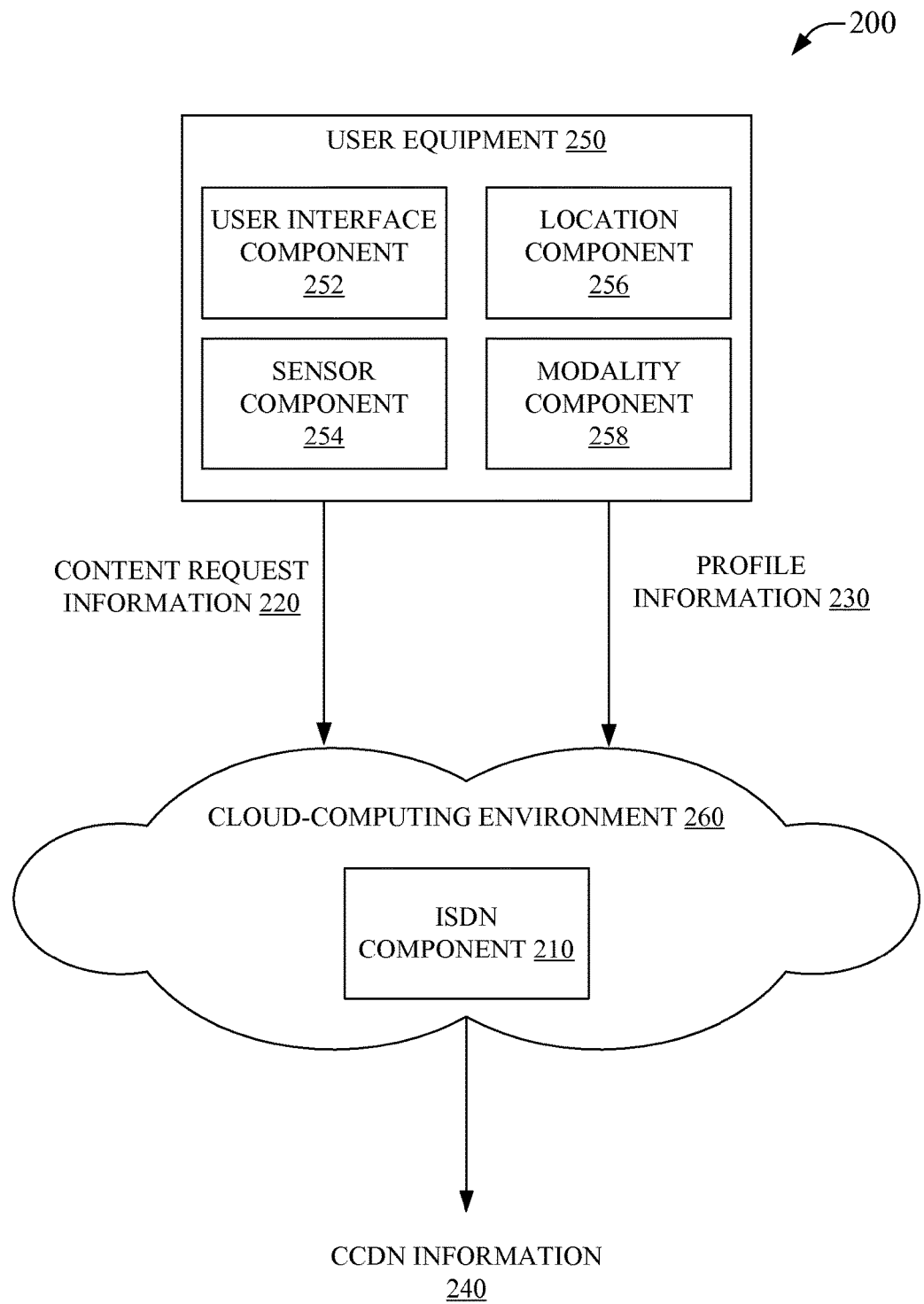
FIG. 2 is a depiction of an example system that facilitates determining a custom content delivery network via a cloud-based intelligent software-defined network in accordance with aspects of the subject disclosure.

FIG. 2 is a depiction of a system 200 that can facilitate determining a custom content delivery network via a cloud-based intelligent software-defined network in accordance with aspects of the subject disclosure. System 200 can comprise ISDN component 210 that can receive content request information 220 and profile information 230. ISDN component 210 can determine CCDN information 240. In an embodiment, ISDN component 210 can be a virtualized component executing on cloud-computing environment 260. In an aspect, cloud-computing environment(s), k e.g., the 'cloud', can comprise converged infrastructure(s) or shared service(s). Cloud resources can be shared by multiple users and can also be dynamically reallocated. The availability of high-capacity networks, inexpensive processors and storage devices have led to a growth in utilization of cloud-computing environment(s).

In an embodiment, ISDN component 210 can determine CCDN information 240 based on content request information 220 and profile information 230. Content request information 220 can comprise information related to a request for content. In a further aspect, profile information 230, as used herein, can refer to information related to a characteristic of, or characteristic associated with, content request information 220. Profile information 230 can comprise data associated with a user profile, a device profile, a user equipment profile, a history, etc. Further, profile information 230 can comprise data associated with environmental conditions associated with content request information 220, such as temperature, weather, time, date, schedule, location, movement, sounds, images, series of images, etc., associated with the content request information 220. Additionally, profile information 230 can comprise data associated with equipment or device status or state, etc., wherein the device and/or equipment can comprise a user equipment (UE), a carrier device, a network device, a communication framework device, a content serving device, etc.

Profile information 230 can allow ISDN component 210 to leverage information related to the conditions surrounding a content request and the character of consumption of the requested content and is expressly not limited to the examples cited herein. By leveraging information related to the conditions surrounding a content request and the character of consumption of the requested content, the network segments comprising a CCDN can be determined and updated to satisfy rules relating to profile information 230. As such, ISDN component 210 can receive nearly any type of information via profile information 230, and can determine, based on profile information 230, which network segments satisfy one or more rules relating to segments comprising transport for the requested content, e.g., content request information 220.

System 200 can further comprise user equipment (UE) 250. In an embodiment, UE 250 can generate content request 220. As an example, a user can input aspects of a content request via user interface component 252 of UE 250, sensor component 254 of UE 250 can initiate a content request based on triggering associated with a senor or sensor modality, etc. In some embodiments, UE 250 can generate profile information 230. As an example, profile information 230 can comprise information from location component 256, modality component 258, user interface component 252, sensor component 254, and/or other information such as user profiles, etc., as disclosed herein. In some embodiments, UE 250 can be a smartphone, tablet, laptop, PC, wearable computing device, etc.

In an aspect, user interface component 252 can comprise different interface modalities. In an embodiment, user interface component 252 can comprise a touch interface, e.g., a touch screen, soft keys, discrete keys, stylus inputs, etc. In other embodiments, user interface component 252 can comprise an audio interface, e.g., speech-to-text, voice recognition, etc. In additional embodiments, user interface component 252 can comprise image or video capture interfaces allowing for gestures, symbols, scans, etc., such as capturing a barcode, QR code, text, hand signals, facial gestures, etc. Other user interface modalities, such as those recited elsewhere herein, can also be comprised in user interface component 252 without departing form the present scope of the disclosure.

In an aspect, sensor component 254 can comprise a sensor device of UE 250 or a sensor device coupled with UE 250. A sensor device of UE 250 can comprise a microphone, thermocouple, image sensor, RFID sensor, video sensor, accelerometer, tilt/roll/yaw sensor, electrical characteristic sensor, etc. As an example, sensor component 254 in a modern smartphone can comprise one or more microphones, a tilt sensor, a camera, a thermometer, a pulse oximeter, etc. A sensor device coupled to UE 250 can comprise nearly any sensor, for example, anemometers, infrared detectors/imagers, external image/video capture devices, external microphone(s), security device feeds, bank/finance/fraud detectors, etc.

In another aspect, location component 256 can determine location information associated with UE 250. In some embodiments, location component 256 can determine current or historic location information related to UE 250. Location information 256 can comprise geospatial location information, elevation, address, proximity, movement, acceleration, speed, etc. As an example, location information 256 can comprise a GPS location for UE 250, e.g., providing a latitude, longitude, and elevation. As a further example, location information 256 can provide an indicator that UE 250 is within a determined proximity from another device, such as a Bluetooth beacon, etc.

In further aspects, modality component 258 can determine information related to communication modalities of UE 250. The information related to communication modalities of UE 250 can comprise the types of modalities, their availability, current or historical performance data for the modalities, power consumption data for each modality, etc. As an example, modality component 258 can determine that UE 250 has LTE and 3GPP wireless modalities and can comprise information indicating the relative power consumption of these modalities as well as historical information, that when correlated with historical and current location information, can indicate that the user is in an area likely to have good coverage in 3GPP but not LTE. This information can be employed to, for example, indicate 3GPP network segments in the CCDN information 240 as preferred to LTE network segments.

In an embodiment CCDN information 240 can comprise information related to selecting networking segments comprising a transport path between a source and a consumer. The transport path can comprise one or more network segments, wherein a segment can be a communication path between any two nodes of a network. Network segments can be connected to form one or more transport(s) that can communicate data between a data source and a data consumer. CCDN information 240 can enable customized provisioning of appropriate network segments in designating the transport(s). Further, ISDN 210 can determine CCDN information 240 comprising rankings, ordered lists, minimum values, maximum values, ranges of values, hierarchical levels of rules, etc., to enable provisioning of transport(s) considerate of the content requested and the conditions surrounding the request and ongoing satisfaction of the request.

Figure 3:
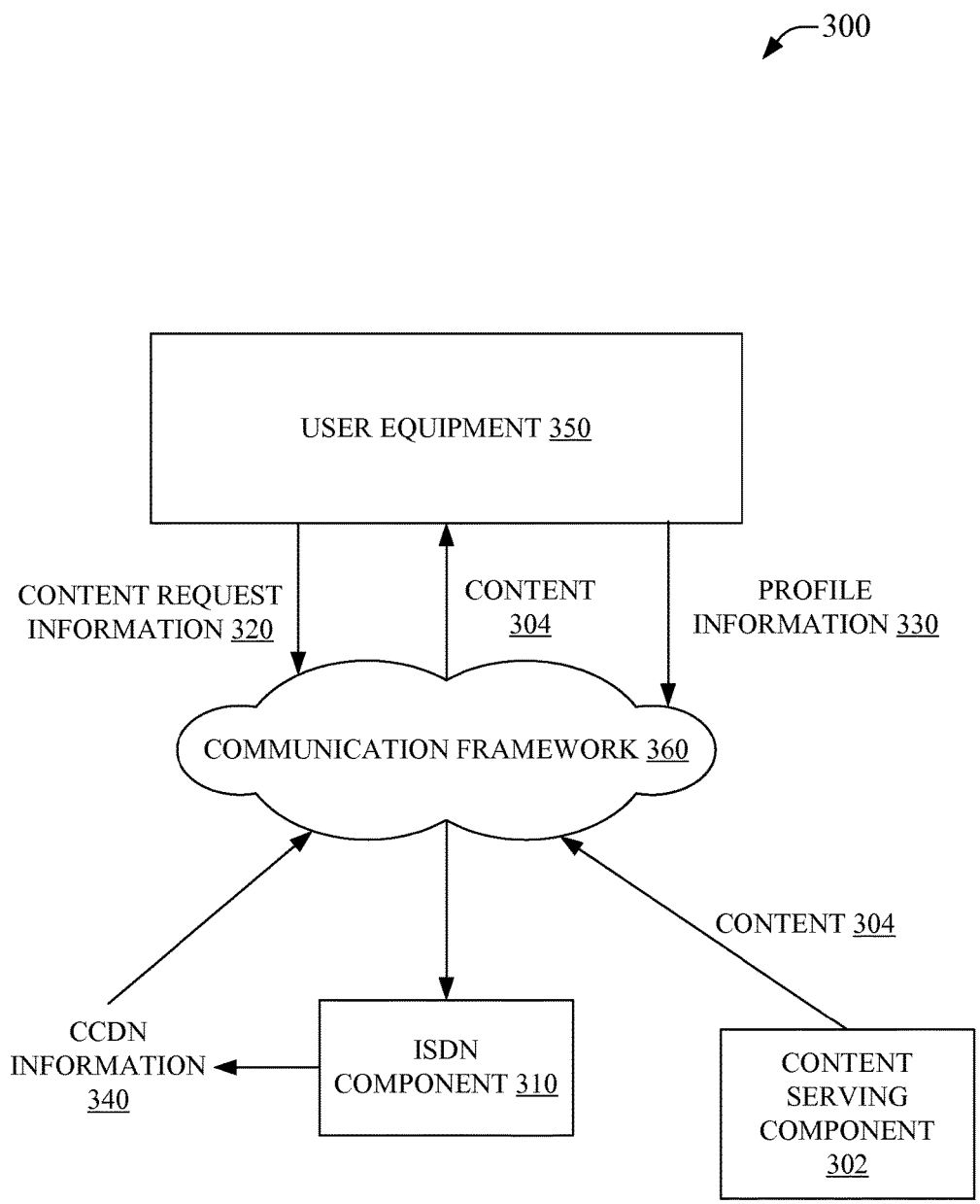
FIG. 3 illustrates an example system that facilitates determining a custom content delivery network between a UE and a Content server via an intelligent software-defined network in accordance with aspects of the subject disclosure.

FIG. 3 illustrates a system 300 that facilitates determining a custom content delivery network between a UE and a Content server via an intelligent software-defined network in accordance with aspects of the subject disclosure. System 300 can comprise ISDN component 310 that can receive content request information 320 and profile information 330 via communication framework 360. ISDN component 310 can determine CCDN information 340.

In an embodiment, ISDN component 310 can determine CCDN information 340 based on content request information 320 and profile information 330. Content request information 320 can comprise information related to a request for content. In an aspect, content request information 320 can comprise information relating to a request to stream audio, video, or multimedia content, information relating to a request to transport data related to a voice call, video call, etc., information relating to a request to text messaging, SMS, MMS, etc., information relating to a request to instant messaging, or other threaded messaging environments, information relating to a request to access files, databases, or other data storage, etc., or information relating to nearly any other request to receive data from a data source, typically located remote from a device associated with the content request of content request information 340.

In a further aspect, profile information 330, as used herein, can comprise information related to a characteristic of, or characteristic associated with, content request information 320. Profile information 330 can comprise data associated with a user profile, a device profile, a user equipment profile, a history, etc. Further, profile information 330 can comprise data associated with environmental conditions associated with content request information 320, such as temperature, weather, time, date, schedule, location, movement, sounds, images, series of images, etc., associated with the content request information 320. Additionally, profile information 330 can comprise data associated with equipment or device status or state, etc., wherein the device and/or equipment can comprise a user equipment (UE), a carrier device, a network device, a communication framework device, a content serving device, etc.

Profile information 330 can enable ISDN component 310 to leverage information related to the conditions surrounding a content request, e.g., 320, and the character or consumption of the requested content. By leveraging information related to the conditions surrounding a content request, e.g., 320, and the character or consumption of the requested content, the network segments comprising a CCDN can be determined and updated to satisfy rules relating to profile information 330. As such, ISDN component 310 can receive nearly any type of information via profile information 330, and can determine, based on profile information 330, which network segments satisfy one or more rules relating to segments comprising transport for the requested content, e.g., content request information 320.

In an embodiment CCDN information 340 can comprise information related to selecting networking segments comprising a transport path between a source and a consumer. The transport path can comprise one or more network segments, wherein a segment can be a communication path between any two nodes of a network. The one or more network segments can be connected to form one or more transport(s) that can communicate data between a data source and a data consumer. CCDN information 340 can enable customized provisioning of appropriate network segments in designating the transport(s). Further, ISDN 310 can determine CCDN information 340 comprising rankings, ordered lists, minimum values, maximum values, hierarchical levels of rules, etc., to enable provisioning of transport(s) with intelligently selected in view of the content requested and the conditions surrounding the request and subsequent delivery thereof.

As illustrated in system 300, CCDN information 340 can be communicated to communication framework 360 via ISDN component 310. This can result in selection of network segment(s) from communication framework 360 that can enable transport(s) for delivery of content 304 from content service component 302 to UE 350, e.g., the device associated with generating content request information 320.

Figure 4:
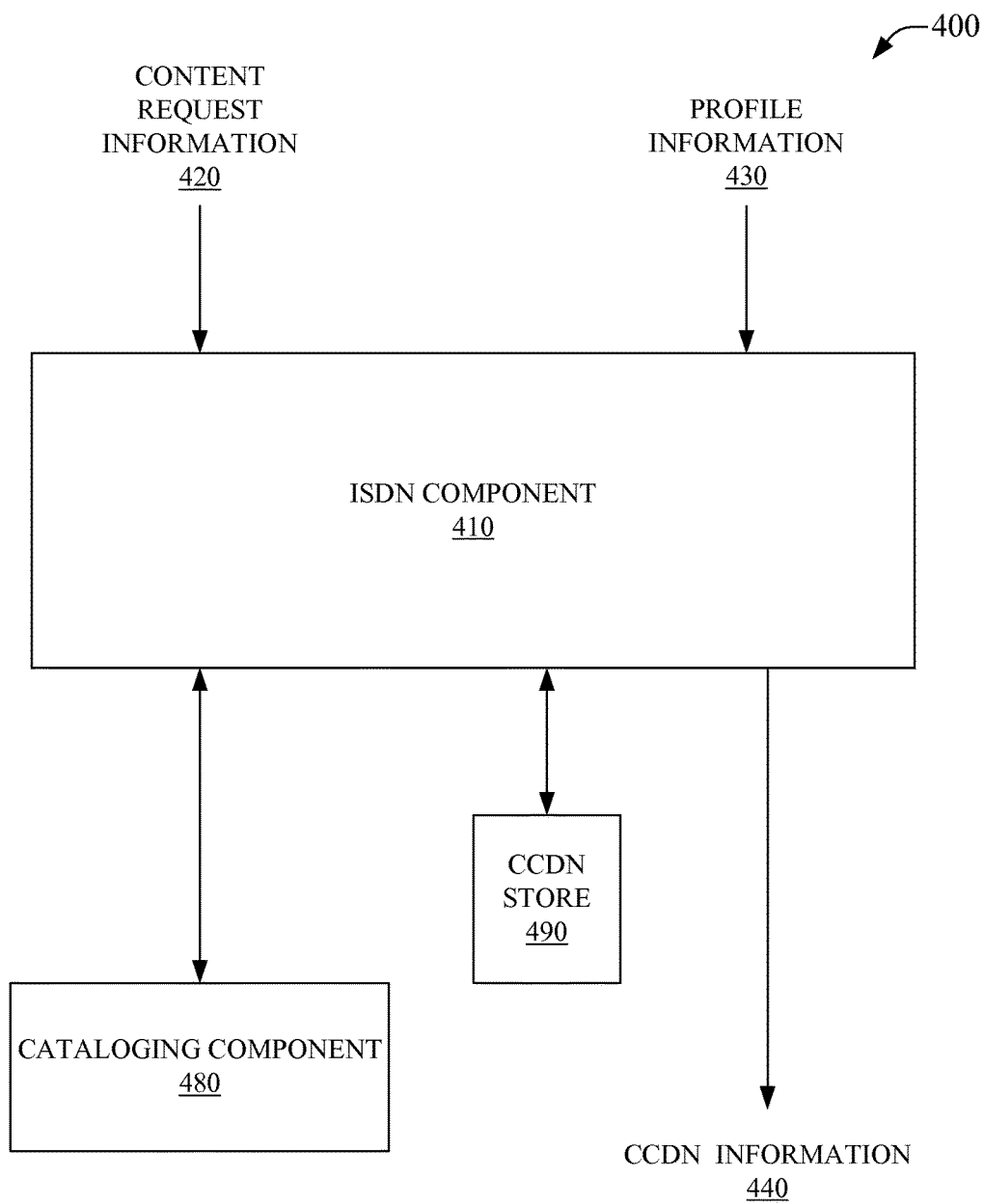
FIG. 4 illustrates an example system that facilitates determining a custom content delivery network via an intelligent software-defined network in conjunction with a custom content delivery network store in accordance with aspects of the subject disclosure.

FIG. 4 illustrates a system 400 that facilitates determining a custom content delivery network via an intelligent software-defined network in conjunction with a custom content delivery network store in accordance with aspects of the subject disclosure. System 400 can comprise ISDN component 410 that can receive content request information 420 and profile information 430. ISDN component 410 can determine CCDN information 440.

In an embodiment, ISDN component 410 can determine CCDN information 440 based on content request information 420 and profile information 430. Content request information 420 can comprise information related to a request for content. In an aspect, content request information 420 can comprise information relating to a request to stream audio, video, or multimedia content, information relating to a request to transport data related to a voice call, video call, etc., information relating to a request to text messaging, SMS, MMS, etc., information relating to a request to instant messaging, or other threaded messaging environments, information relating to a request to access files, databases, or other data storage, etc., or information relating to nearly any other request to receive data from a data source, typically located remote from a device associated with the content request of content request information 440.

In a further aspect, profile information 430, as used herein, can comprise information related to a characteristic of, or characteristic associated with, content request information 420. Profile information 430 can comprise data associated with a user profile, a device profile, a user equipment profile, a history, etc. Further, profile information 430 can comprise data associated with environmental conditions associated with content request information 420, such as temperature, weather, time, date, schedule, location, movement, sounds, images, series of images, etc., associated with the content request information 420. Additionally, profile information 430 can comprise data associated with equipment or device status or state, etc., wherein the device and/or equipment can comprise a user equipment (UE), a carrier device, a network device, a communication framework device, a content serving device, etc.

Profile information 430 can enable ISDN component 410 to leverage information related to the conditions surrounding a content request, e.g., 420, and the character or consumption of the requested content. By leveraging information related to the conditions surrounding a content request, e.g., 420, and the character or consumption of the requested content, the network segments comprising a CCDN can be determined and updated to satisfy rules relating to profile information 430. As such, ISDN component 410 can receive nearly any type of information via profile information 430, and can determine, based on profile information 430, which network segments satisfy one or more rules relating to segments comprising transport for the requested content, e.g., content request information 420.

System 400 can further comprise cataloging component 480. Cataloging component 480 can catalog information related to network segment(s). This can be likened to crawling webpages, however, in this instance the crawl results in population of an information storage system that relates to characteristics of network segment(s). As such, rather than relying solely on testing network segments on an ad hoc basis, the catalog component can enable access to information relating to a last known state of wireless segments and historical information for the same. This can facilitate selection of, testing of, and updating information relating to, network segments. Cataloging component 480 can enable selection of network segments based in whole, or in part, on previously known network segment information. As an example, the history of a wireless network segment at a local coffee shop can be recorded and analyzed. This information, related to that particular wireless network segment can be stored by cataloging component 480. ISDN component 410 can then, for example, access the wireless network segment information when determining if that wireless network segment should be included in, or how it should be ranked in, CCDN information 440 for a transport (s) in response to content request information 420 being received. Moreover, as the example wireless network segment information ages, cataloging component 480 can facilitate updating the information, for example, by triggering a update, flagging the information as stale or in need of refreshing, determining an update of the information, etc.

In an embodiment CCDN information 440 can comprise information related to selecting networking segments comprising a transport path between a source and a consumer. The transport path can comprise one or more network segments, wherein a segment can be a communication path between any two nodes of a network. The one or more network segments can be connected to form one or more transport(s) that can communicate data between a data source and a data consumer. CCDN information 440 can enable customized provisioning of appropriate network segments in designating the transport(s). Further, ISDN 410 can determine CCDN information 440 comprising rankings, ordered lists, minimum values, maximum values, hierarchical levels of rules, etc., to enable provisioning of transport(s) with intelligently selected in view of the content requested and the conditions surrounding the request and subsequent delivery thereof.

System 400 can further enable storage of determined CCDN information, via CCDN store 490 that can be communicatively coupled to ISDN component 410. Where ISDN component 490 determines CCDN information 440, this information, of related information, can be stored via CCDN store 490. In an aspect, this can enable analysis of CCDN information 440 in conjunction with, for example user feedback, device analytics, etc. In a further aspect, where similar, or the same, content request information 420 is received by ISDN component 410, the existing CCDN information 440 stored via CCDN store 490 can be received and employed in determining an update to CCDN information 440 in conjunction with the newer content request. This can reduce resource use for redetermination of similar, or the same, CCDN information 440. As an example, where a user regularly requests the same content, from the same location, at the same time, and under similar device states, a previous CCDN determination that was stored via CCDN store 490 can serve as an efficient surrogate for calculating new CCDN information 440, can act as a starting point for updating the previous CCDN determination for the new states, etc.

Figure 5:
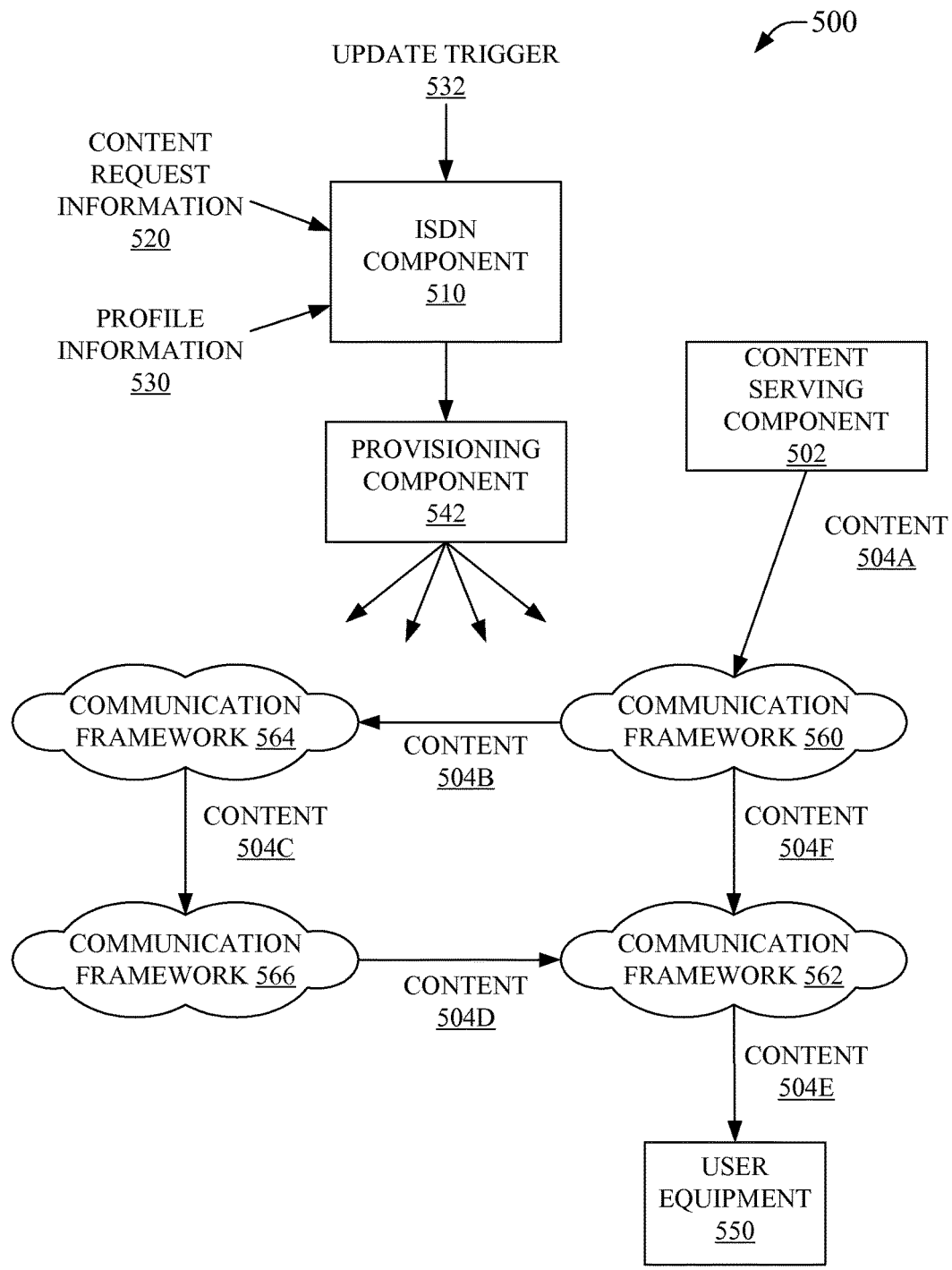
FIG. 5 illustrates an example system facilitating determining and provisioning a custom content delivery network via an intelligent software-defined network in accordance with aspects of the subject disclosure.

FIG. 5 illustrates a system 500 that facilitates determining and provisioning a custom content delivery network via an intelligent software-defined network in accordance with aspects of the subject disclosure. System 500 can comprise ISDN component 510 that can receive content request information 520 and profile information 530. ISDN component 510 can determine CCDN information.

In an embodiment, ISDN component 510 can determine CCDN information based on content request information 520 and profile information 530. Content request information 520 can comprise information related to a request for content. Content request information 520 can comprise information relating to a request to stream audio, video, or multimedia content, information relating to a request to transport data related to a voice call, video call, etc., information relating to a request to text messaging, SMS, MMS, etc., information relating to a request to instant messaging, or other threaded messaging environments, information relating to a request to access files, databases, or other data storage, etc., or information relating to nearly any other request to receive data from a data source.

In a further aspect, profile information 530 can comprise information related to a characteristic of, or characteristic associated with, content request information 520. Profile information 530 can comprise data associated with a user profile, a device profile, a user equipment profile, a history, etc. Further, profile information 530 can comprise data associated with environmental conditions associated with content request information 520, such as temperature, weather, time, date, schedule, location, movement, sounds, images, series of images, etc., associated with the content request information 520. Additionally, profile information 530 can comprise data associated with equipment or device status or state, etc., wherein the device and/or equipment can comprise a UE, a carrier device, a network device, a communication framework device, a content serving device, etc.

Further, profile information 530 can facilitate ISDN component 510 leveraging information related to the conditions surrounding a content request, e.g., 520, and the character of consumption of the requested content. By leveraging information related to the conditions surrounding a content request, e.g., 520, and the character of consumption of the requested content, the network segments comprising a CCDN can be determined and updated to satisfy rules relating to profile information 530. As such, ISDN component 510 can receive nearly any type of information via profile information 530, and can determine, based on profile information 530, which network segments satisfy one or more rules relating to segments comprising transport for the requested content, e.g., content request information 520.

In an embodiment CCDN information can comprise information related to selecting networking segments comprising a transport path between a source and a consumer. The transport path can comprise one or more network segments, wherein a segment can be a communication path between any two nodes of a network. The one or more network segments can be connected to form one or more transport(s), that can communicate data between a data source and a data consumer. CCDN information can enable customized provisioning of appropriate network segments in designating the transport. Further, ISDN 510 can determine CCDN information 540 comprising rankings, ordered lists, minimum values, maximum values, ranges of values, hierarchical levels of rules, etc., to enable provisioning of transport(s) with regard to the content requested and the conditions surrounding the request and satisfaction of the request.

Provisioning component 542 can receive CCDN information via ISDN component 510. Provisioning component can provision network segments from one or more communication framework(s), e.g., communication frameworks 560-566. This can enable designation and provisioning of transport(s), e.g., transport segments to enable transporting from content serving component 502, content 504A to 504B to 504C to 504D to 504E to UE 550, herein after '504ABCDE', transport segments to enable transporting from content serving component 502, content 504A to 504F to 504E to UE 550, herein after '504AFE', or other transport (s) between content serving component 502 and UE 550. In an embodiment, ISDN component 510 can enable ranking of transport 504ABCDE in relation to transport 504AFE, or other transport(s) to facilitate selection of a preferably ranked transport to satisfy the content request associated with content request information 520 in view of profile information 530.

In some embodiments, for example where profile information 530 evolves, ISDN component 510 can adapt CCDN information to update the provisioning of transport(s). As an example, where a user is initially using transport 504AFE for content delivery from content serving component 502 to UE 550, this transport can be adapted to transport 504ABCDE, to reflect changes in profile information 530. This updating can be automatic or can be triggered, e.g., via update trigger 532. Update trigger 532 can comprise an achieved time trigger, an elapsed time trigger, a trigger in response to sensor information, e.g., via sensor component 254, etc., a location trigger, e.g., via location component 256, etc., or nearly any other trigger event. This can provide for real-time, or near real-time updating of CCDN information and the related provisioned transport(s).

Figure 6:
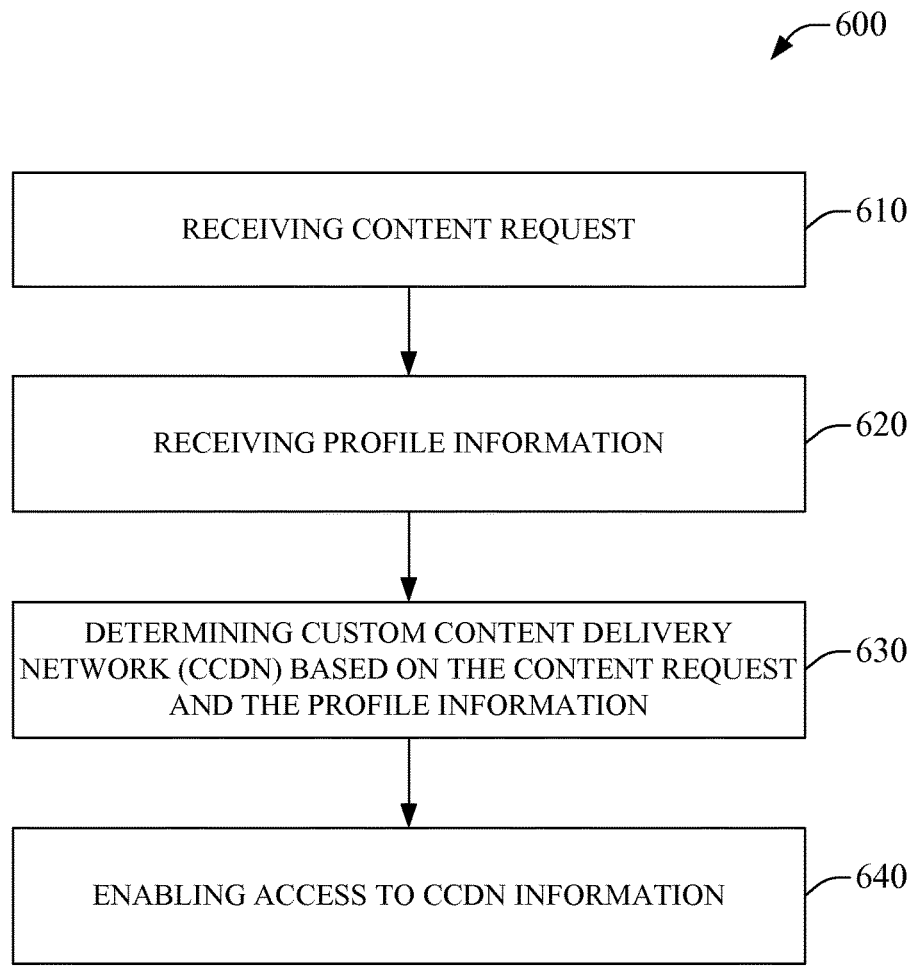
FIG. 6 illustrates an example method facilitating determining a custom content delivery network based on the content request and profile information in accordance with aspects of the subject disclosure.
Figure 7:
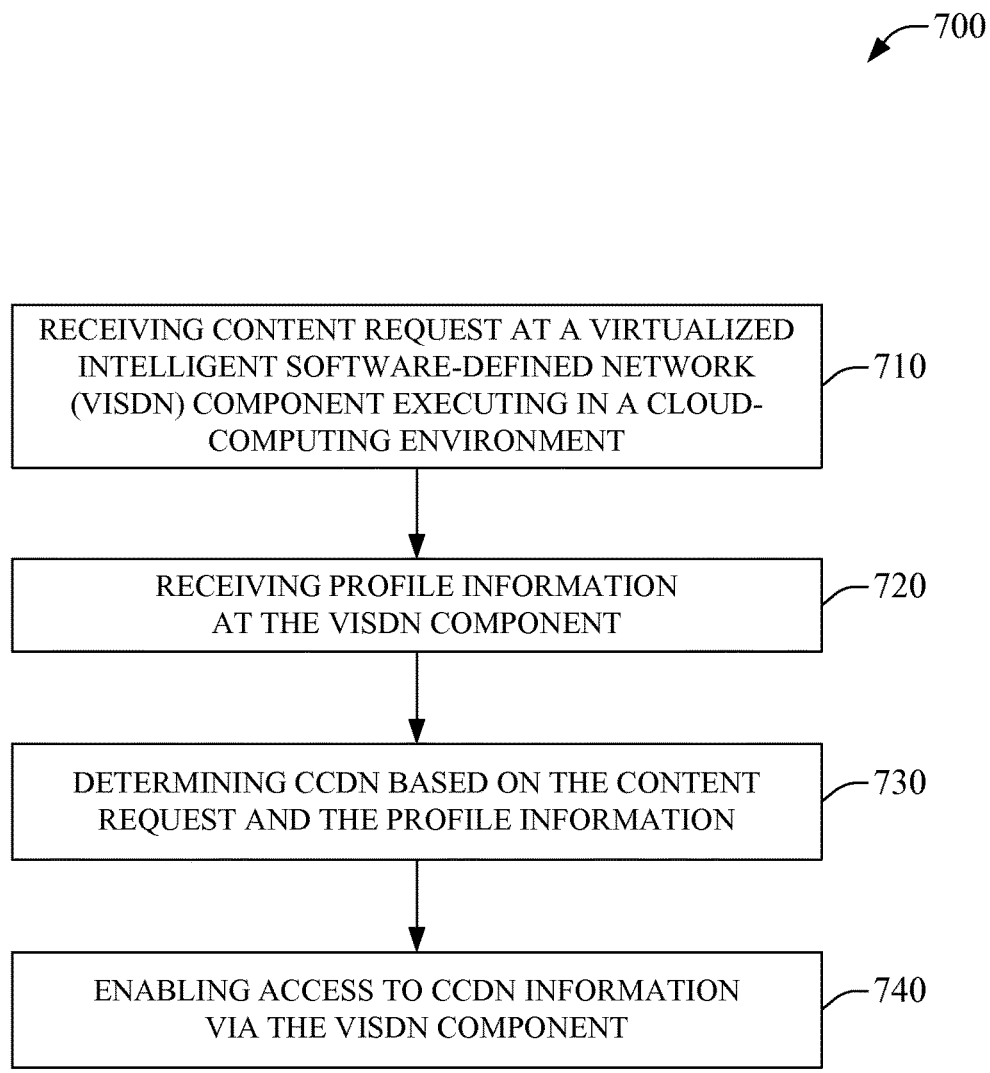
FIG. 7 depicts an example method facilitating determining a custom content delivery network via a virtualized intelligent software-defined network component in accordance with aspects of the subject disclosure.
Figure 8:
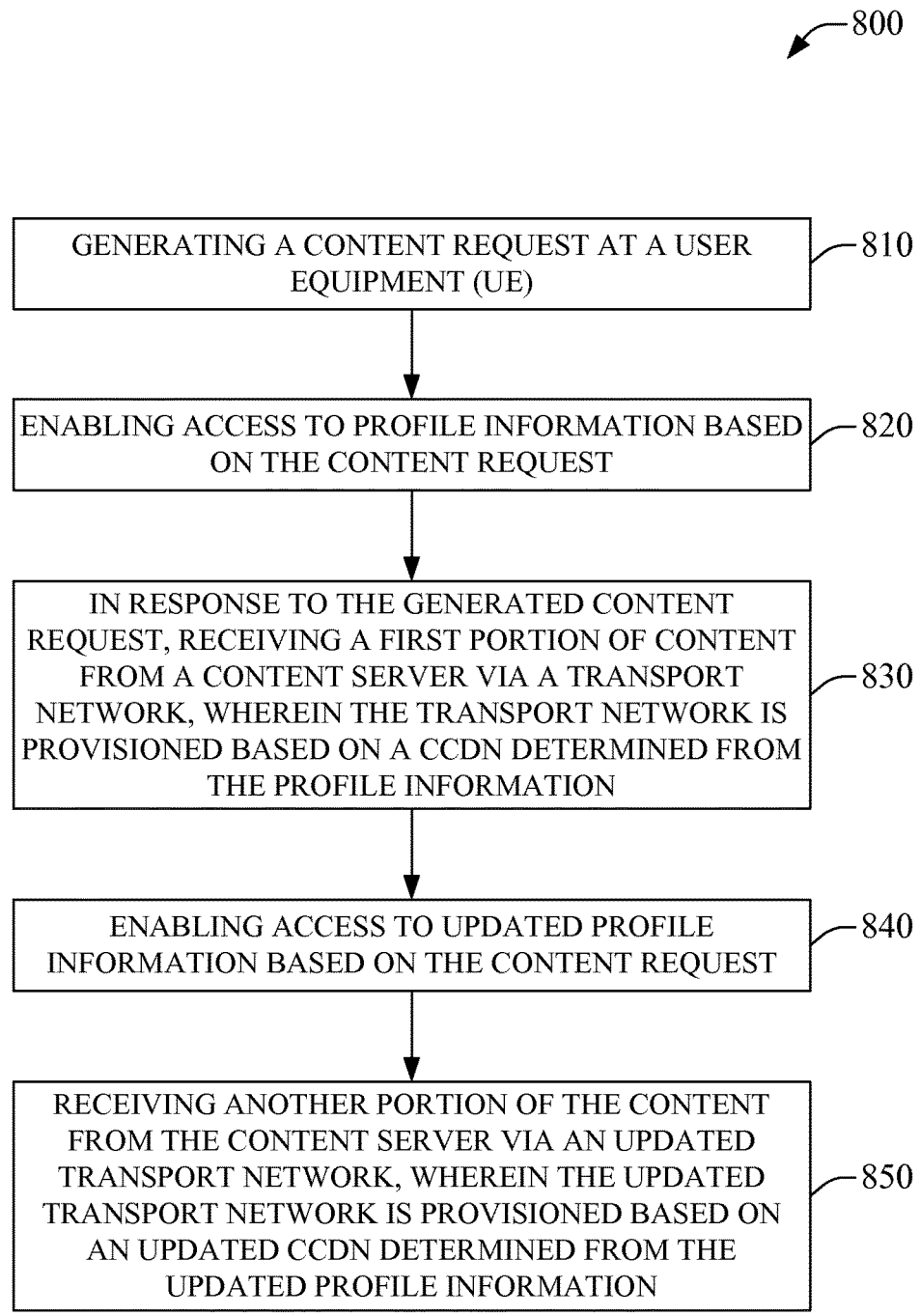
FIG. 8 illustrates an example method facilitating receiving content via a custom content delivery network in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 facilitating determining a custom content delivery network based on the content request and profile information in accordance with aspects of the subject disclosure. At 610, method 600 can comprise receiving a content request. The content request can comprise information related to a request for content. The content request, for example, can comprise information relating to a request to stream audio, video, or multimedia content, information relating to a request to transport data related to a voice call, video call, etc., information relating to a request to text messaging, SMS, MMS, etc., information relating to a request to instant messaging, or other threaded messaging environments, information relating to a request to access files, databases, or other data storage, etc., or information relating to nearly any other request to receive data from a data source.

At 620, method 600 can comprise receiving profile information, for example from a user equipment (UE). Profile information can refer to information related to a characteristic of, or a characteristic associated with, the content request. Profile information can comprise data associated with a user profile, a device profile, a user equipment profile, a history, etc. As an example, profile information can comprise a user account number, a mobile device identifier, a user selected preference, a billing tier rate, a customer loyalty account identifier, a user history in relation to the content requested, etc. Further, profile information can comprise data associated with environmental conditions associated with the content request, such as temperature, weather, time, date, schedule, location, movement, sounds, images, series of images, etc., associated with the content request. As an example, profile information can comprise information indicating the requesting user device is located in Seattle on a rainy day, at 8:00 am on a Mon., based on device measurements of time and weather, location information, and analysis of sounds picked up by the device microphone being interpreted as the sound of rain drops on a windshield. Additionally, profile information can comprise data associated with equipment or device status or state, etc., wherein the device and/or equipment can comprise a UE, a carrier device, a network device, a communication framework device, a content serving device, etc. As an example, profile information can comprise information indicating a UE battery condition or state, executing or background applications, RAN states or status, content server locations, reliability, cached status, bandwidth history, or nearly any other metric, measurement, status, or state of equipment(s) or device(s) associated with transferring content between content server(s) and consuming user equipment(s).

In an aspect, the profile information received at 620 can enable, at 630, determining custom content delivery network (CCDN) information. The CCDN information can be further based on the content request received at 610. Leveraging information related to the conditions surrounding a content request and the character or ongoing consumption of the requested content. By leveraging information related to the conditions surrounding a content request and the character or consumption of the requested content, the network segments comprising a CCDN can be determined and updated to satisfy rules relating to the profile information. As such, nearly any type of information comprising profile information can be employed to determine network segment(s) that satisfy one or more rules relating to segment(s) comprising transport(s) for the requested content. As an example, application of the one or more rules to received profile information 130 can indicate that high-speed network segments are preferable in the content transport, e.g., CCDN, because a user of the requesting user equipment is identified as being a member of a premium network service, e.g., the user pays for high speeds. However, where the user behavior also reflects that the immediate need for the content corresponds to a low level need, the CCDN can be updated to select moderate-speed network segment(s) to satisfy the user experience while not expending high-speed resources unnecessarily. Further, where the example user provides feedback related to the use of the moderate-speed network segment(s), the rule can be updated to improve correlation between the rule and the user's expectations.

At 640, method 600 can comprise enabling access to CCDN information. At this point, method 600 can end. The determined CCDN information from 630 can be access, for example, by other devices or components, at 640. As such, transport(s) can be provisioned based on the CCDN information from 640. As an example, a provisioning component can receive CCDN information at 640 to enable provisioning of network segment(s) forming transport(s) corresponding to the CCDN information determined at 630.

FIG. 7 illustrates a method 700 that facilitates determining a custom content delivery network via a virtualized intelligent software-defined network component in accordance with aspects of the subject disclosure. At 710, method 700 can comprise receiving a content request at a virtualized ISDN (VISDN) component. The VISDN component can be executing in a cloud-computing environment. The content request can comprise information related to a request for content. The content request, for example, can comprise information relating to a request to stream audio, video, or multimedia content, information relating to a request to transport data related to a voice call, video call, etc., information relating to a request to text messaging, SMS, MMS, etc., information relating to a request to instant messaging, or other threaded messaging environments, information relating to a request to access files, databases, or other data storage, etc., or information relating to nearly any other request to receive data from a data source.

At 720, method 700 can comprise receiving profile information at the VISDN component. Profile information can refer to information related to a characteristic of, or a characteristic associated with, the content request. Profile information can comprise data associated with a user profile, a device profile, a user equipment profile, a history, etc. Further, profile information can comprise data associated with environmental conditions associated with the content request, such as temperature, weather, time, date, schedule, location, movement, sounds, images, series of images, etc., associated with the content request. Additionally, profile information can comprise data associated with equipment or device status or state, etc., wherein the device and/or equipment can comprise a UE, a carrier device, a network device, a communication framework device, a content serving device, etc.

At 730, method 700 can comprise determining CCDN based on the content request of 710 and the profile information of 720. Leveraging information related to the conditions surrounding a content request and the character or ongoing consumption of the requested content. By leveraging information related to the conditions surrounding a content request and the character or consumption of the requested content, the network segments comprising a CCDN can be determined and updated to satisfy rules relating to the profile information. As such, nearly any type of information comprising profile information can be employed to determine network segment(s) that satisfy one or more rules relating to segment(s) comprising transport(s) for the requested content.

At 740, method 700 can comprise enabling access, e.g., via the VISDN component, to CCDN information. At this point, method 700 can end. The determined CCDN information from 730 can be accessed, for example, by other devices or components, at 740. As such, transport(s) can be provisioned based on the CCDN information from 740. As an example, a provisioning component can receive CCDN information at 740 to enable provisioning of network segment(s) forming transport(s) corresponding to the CCDN information determined at 730.

FIG. 8 illustrates a method 800 that facilitates receiving content via a custom content delivery network in accordance with aspects of the subject disclosure. At 810, method 800 can comprise generating a content request at a UE. A UE, e.g., 250, 350, 550, etc., can generate a content request related to receiving content from a content source, e.g., content serving component 302, 502, etc. The generated content request can be communicated via a coupled communication framework, e.g., 260. 360, etc.

At 820, method 800 can comprise enabling access to profile information based on the content request from 810. Profile information can comprise information related to a characteristic of, or a characteristic associated with, the content request. Profile information can comprise data associated with a user profile, a device profile, a user equipment profile, a history, etc. Further, profile information can comprise data associated with environmental conditions associated with the content request, such as temperature, weather, time, date, schedule, location, movement, sounds, images, series of images, etc., associated with the content request. Additionally, profile information can comprise data associated with equipment or device status or state, etc., wherein the device and/or equipment can comprise a UE, a carrier device, a network device, a communication framework device, a content serving device, etc.

At 830, method 800 can comprise receiving, in response to the generating the content request, a first portion of content from a content server via a transport network. The transport network can be provisioned based on a CCDN determined from accessed the profile information related to the enabling access at 820. The first portion of the content received is carried over transport(s) determined by leveraging information related to the conditions surrounding a content request and the character or ongoing consumption of the requested content, e.g., the profile information accessible via 820. By leveraging information related to the conditions surrounding a content request and the character or consumption of the requested content, the network segments comprising a CCDN can be determined and updated to satisfy rules relating to the profile information. As such, nearly any type of information comprising profile information can be employed to determine network segment(s) that satisfy one or more rules relating to segment(s) comprising transport(s) for the requested content. This CCDN can then be employed to provision transport network(s) over which content can be received at 830.

At 840, method 800 can comprise enabling access to updated profile information based on the content request generated at 810. Profile information can evolve in some embodiments and this profile information evolution can be mirrored in the determined CCDN, and thus the transport network(s) over which content is received. Enabling access to updated profile information can be the same or similar to enabling access to profile information at 820.

At 850, method 800 can comprise receiving another portion of the content from the content server vie an updated transport network(s). The updated transport network(s) can be provisioned based on an updated CCDN determined from the updated profile information accessed at 840. Wherein the transport network can be provisioned based on a CCDN, it can also be updated based on an updated CCDN based on updated profile information. The other portion of the content received can be carried over updated transport(s) determined by leveraging information related to the updated conditions surrounding a content request, such as the character of the ongoing consumption of the requested content. By leveraging updated information related to the conditions surrounding a content request and the consumption of the requested content, the network segments comprising a CCDN can be updated to satisfy rules relating to the updated profile information. As such, nearly any type of information comprising updated profile information can be employed to determine network segment(s) that satisfy one or more rules relating to segment(s) comprising updated transport network (s) for the requested content. This updated CCDN can then be employed to update the provisioning of the transport network(s) over which the content can be received.

Figure 9:
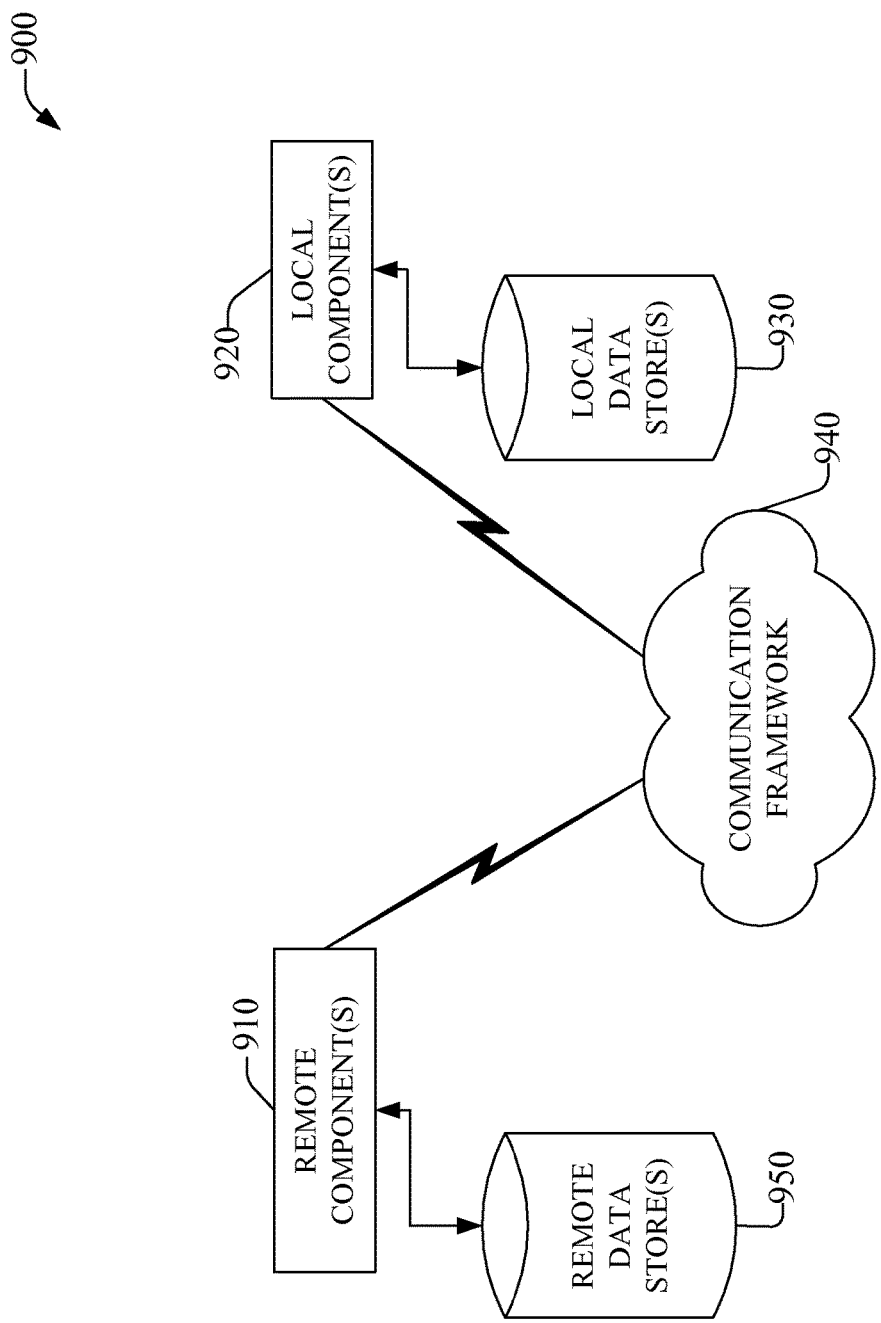
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, etc. As an example, remote component(s) 910 can be ISDN component 110, 210, 310, 410, etc., content service component 302, 502, etc., UE 250, 350, 550, etc., CCDN store 490, etc., cataloging component 480, etc.

The system 900 also comprises one or more local component(s) 920. The local component(s) 920 can be hardware and/or software (e.g., threads, processes, computing devices). In some embodiments, local component(s) 920 can comprise, for example, UE 250, 350, 550, etc., ISDN component 110, 310, 410, 510, etc.

One possible communication between a remote component(s) 910 and a local component(s) 920 can be in the form of a data packet adapted to be transmitted between two or more computer processes. Another possible communication between a remote component(s) 910 and a local component (s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
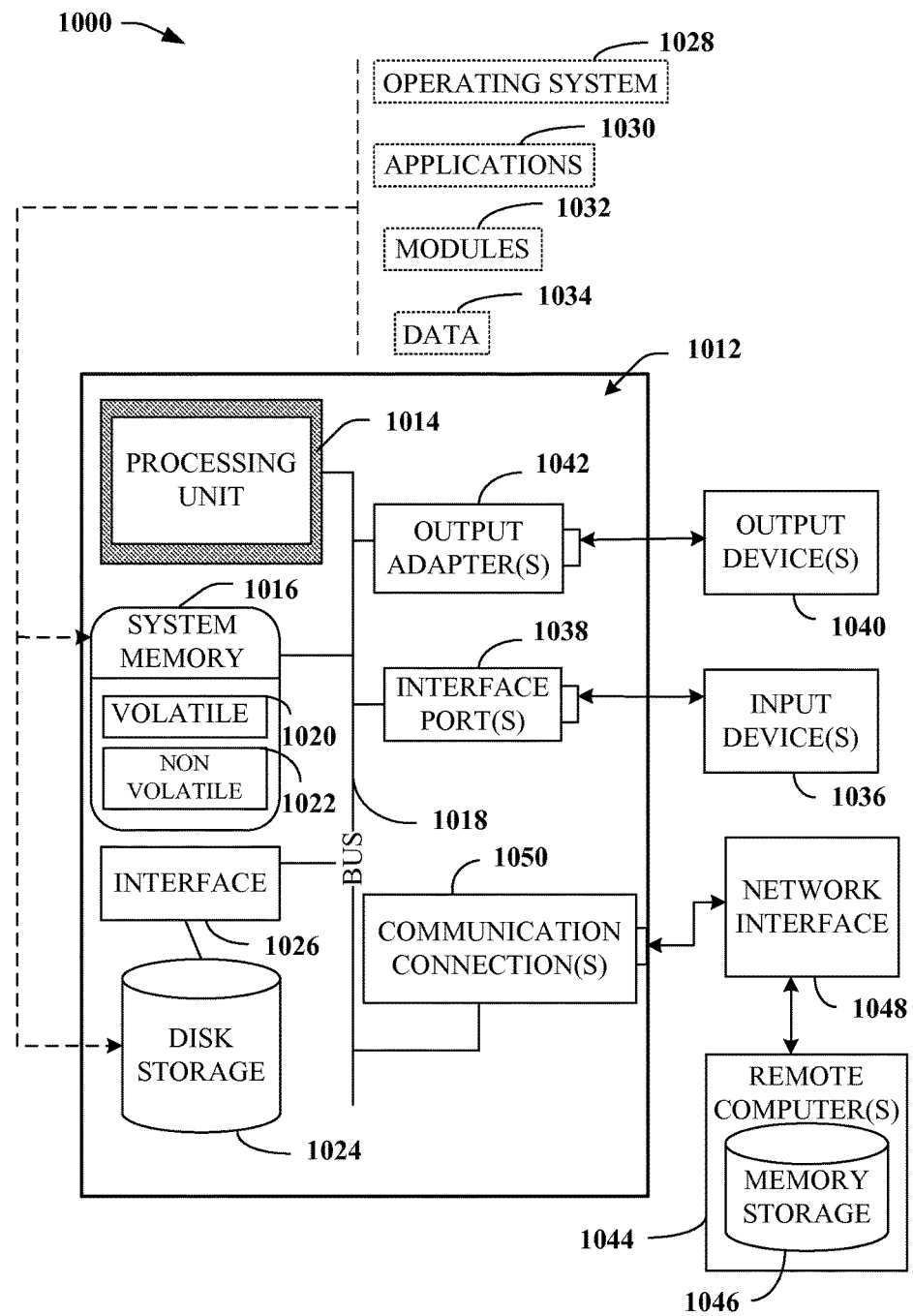
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of ISDN component 110, 210, 310, 410, etc., content service component 302, 502, etc., UE 250, 350, 550, etc., CCDN store 490, etc., cataloging component 480, etc., comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving trigger information a remote device, e.g., a UE, and in response, generating communication augmentation information that can be accessed via an air interface or other wireless interface by one or more service interface components or other UEs to enable context sensitive communication augmentation.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse input GUI, a command line controlled interface, etc., allowing a user to interact with computer 1012. As an example, UI Component 252 can receive touch, motion, audio, visual, or other types of input. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
    a processor; and
    a memory that stores executable instructions that, when executed by the processor, facilitate performance of operations, comprising:
        receiving a request for delivery of first content from a user equipment;
        receiving profile information related to a condition associated with the user equipment;
        determining first transport network information based on the request and the profile information;
        facilitating access to the first transport network information to enable the user equipment to access at least a first portion of the first content via a first transport network of first devices provisioned based on the first transport network information;
        obtaining updated profile information representing an update to the profile information, wherein the update to the profile information results from the condition of the user equipment having changed to an updated condition of the user equipment; and
        facilitating access to second transport network information to enable the user equipment to access second content via a second transport network of second devices provisioned in response to determining that the first transport network information has changed based on the updated profile information, wherein the second content is associated with the request for delivery of the first content.

2. The system of claim 1, wherein the user equipment is a mobile device.

3. The system of claim 1, wherein the user equipment is not a mobile device.

4. The system of claim 1, wherein the determining the first transport network information is performed by a virtual machine of a network device of the system.

5. The system of claim 1, wherein the determining the first transport network information comprises determining whether a rule related to a bandwidth constraint determined from the profile information is satisfied.

6. The system of claim 1, wherein the operations further comprise updating the first transport network information in response to determining the profile information has been changed to the updated profile information.

7. The system of claim 6, wherein the obtaining the updated profile information is triggered by an event associated with the user equipment.

8. The system of claim 6, wherein the obtaining the updated profile information is triggered by a recurring event.

9. The system of claim 1, wherein the determining the first transport network information further comprises receiving network segment information related to a network segment from a network segment information data store.

10. A method, comprising:
    receiving, by a system comprising a processor, content request information related to receiving first content at a user equipment;
    receiving, by the system, profile information related to an environment associated with the content request information;
    determining, by the system, first transport network information based on the content request information and the profile information;
    facilitating, by the system, access to the first transport network information to enable provisioning of the user equipment based on the first transport network information; and
    facilitating, by the system, access to second transport network information to enable reprovisioning of the user equipment in response to determining a change in the profile information related to a change in the environment associated with the content request information, wherein the facilitating the access to the second transport network information enables access to second content associated with the content request information, and wherein the receiving the first content is via a first transport network that is different than a second transport network associated with the access to the second content.

11. The method of claim 10, wherein the user equipment is a mobile device.

12. The method of claim 10, wherein the method is performed at least in part by a virtual machine executing on the system.

13. The method of claim 10, further comprising adapting, by the system, the profile information and in response to the profile information being determined to have been adapted, adapting, by the system, the first transport network information.

14. The method of claim 13, wherein the adapting the profile information is in response to an environment associated with the user equipment being determined to have changed.

15. The method of claim 13, wherein the adapting the profile information is part of an iterative loop that adapts the profile information.

16. The method of claim 13, wherein the adapting the profile is in response to an interaction with a user equipment being determined to have changed.

17. A first device, comprising:
a processor; and
a memory that stores executable instructions that, when executed by the processor, facilitate performance of operations, comprising:
    generating a content request;
    enabling access to the content request by a second device;
    enabling access to device status information related to a characteristic associated with the first device;
    receiving first content associated with the content request via a first transport network device of a first transport network provisioned in response to determined network segment information, wherein the determined network segment information is based on the content request and the device status information; and
    receiving second content associated with the first content request via a second transport network device of a second transport network provisioned in response to the determined network segment information changing to updated determined network segment information, wherein the updated determined network segment information is based on the content request and updated device status information, and wherein the updated device status information results from an update to the device status information.

18. The device of claim 17, wherein the first device is a mobile device.

19. The device of claim 17, wherein the second device comprises a virtual machine operating on a remote server comprising a processor, and wherein the receiving the first content via the first transport network device comprises the first transport network being provisioned in response to the determined network segment information determined by the virtual machine.

20. The device of claim 17, wherein the first device is not a mobile device.

* * * * *